United States Patent Office.

RENÉ BOHN, OF MANNHEIM, ASSIGNOR TO THE BADISCHE ANILIN AND SODA FABRIK, OF LUDWIGSHAFEN, GERMANY.

BLACK DYE.

SPECIFICATION forming part of Letters Patent No. 545,336, dated August 27, 1895.

Application filed October 9, 1894. Serial No. 525,364. (Specimens.) Patented in England June 5, 1893, No. 10,996, and in France April 7, 1894, No. 237,610.

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of New Black Coloring-Matters, (for which patents have been obtained in England, No. 10,996, dated June 5, 1893, and in France, No. 237,610, dated April 7, 1894,) of which the following is a specification.

It is well known that on nitrating naphthalene in such a way that two nitro groups enter the molecule a mixture containing two isomeric dinitro-naphthalenes is obtained—namely, the so-called "1.4' and 1.1' dinitro-naphthalenes."

My present invention relates to the production of new black coloring-matters, which are obtained by the treatment of the said dinitro-naphthalenes either singly or in admixture one with the other under suitable conditions with sodium sulfid, as is hereinafter more particularly set forth.

Already in the early years of the coal-tar color industry unsuccessful attempts were made to produce useful dyes from the mixture of these nitro compounds, although such had been obtained from nitro-benzene. Thus, in 1861, Troost experimented on the action of alkaline reducing agents on the said dinitro-naphthalines with a view to the foundation of a practical manufacture; but neither he nor other chemists—Roussin, Carey-Lea, Kopp, and others—who made experiments with a similar object attained any useful result, and all experiments of this kind were abandoned, and for over thirty years nothing more has been published with reference to this problem. In the meantime one constituent of the above-mentioned mixture — namely, the so-called "1.4' or alpha-dinitronaphthalene"— has come into use in large quantities in the manufacture of naphthazarine of 1.4' naphthalenediamin and of other bodies. No useful application, however, has been discovered for the 1.1' dinitro compound, and this consequently constitutes a valueless and irksome by-product in the above manufactures. Now I have invented processes for the production of very valuable new black coloring-matters from this hitherto useless by-product. The said coloring-matters cannot be used in dyeing in the usual way; but if they be applied to cotton, linen, jute, or the like, by using a strongly alkaline dye-bath or printing-mixture, with or without the addition of a reducing agent, such as grape-sugar, then fine black shades are obtained, resisting the action of acids, alkalies, and light. Two different products possessing this generic property are obtained, according to the conditions of concentration, temperature, and proportions of reagents used, as is hereinafter illustrated in the examples. Under ordinary conditions a mixture of these products is usually obtained. These need not be separated from one another in practical working, as the mixture can be directly used for dyeing or printing. The two products differ mainly with reference to their solubility in soda solution, one being soluble in that reagent, the other insoluble, or nearly so.

In the present application I intend to claim my new black coloring-matters, whether mixed or isolated, generically, and also the specific coloring-matter, which is insoluble in soda solution, and, except in so far as it is generically claimed, I make no claim in this application to the isolated specific dye, which is soluble in that reagent, and which forms the subject-matter of a separate application filed October 9, 1894, Serial No. 525,365.

The following examples will serve to illustrate the manner in which my invention can best be carried into practical effect and the new dyes obtained. The parts are by weight:

*Example I: Production of the coloring-matter insoluble in soda solution.*—Mix together about fifty (50) parts of the 1.1' dinitro-naphthalene and about six thousand (6,000) parts of water, boil the mixture, and add about two hundred (200) parts of sodium sulfid, ($Na_2S + 9Aq$;) boil for about half an hour, or until no dinitro-naphthalene remains unchanged, filter, add about five hundred (500) parts of hydrochloric acid [containing about thirty per cent. (30%) real acid] to the violet solution obtained, boil two hours longer, filter, and wash. The main product is insoluble in soda solution, but usually contains some of the dye soluble therein, which can be extracted with soda, if desired. For this purpose boil the whole product with about five thousand (5,000) parts of a ten per cent. soda solution. This dye is preferably prepared and used in the form of paste and is applied to vegetable fiber by the aid of the special dyeing process hereinbefore mentioned, consisting in preparing a dye-vat by the use of reducing agent, such as grape sugar, and a strongly-alkaline solution containing up to about twenty-five per cent. of soda, (25% $Na_2CO_3$.)

*Example II: Production of the coloring-matter soluble in hot soda solution.*—Mix together about fifty (50) parts of the 1.1' dinitro-naphthalene, about one hundred and sixty (160) parts of water, and about one hundred and sixty-five (165) parts of sodium sulfid, ($Na_2S+9Aq$.) Stir the mixture cold for about five hours, or until no unchanged dinitro-naphthalene remains, then dilute with about five hundred (500) parts of water, filter, and acidify cold with about three hundred (300) parts of acetic acid, filter, and wash. The product so obtained is in the main soluble in hot soda solution, but usually contains some dye insoluble therein, from which it can readily be purified, if desired. For this purpose dissolve the product in about five thousand (5,000) parts of hot soda solution, [containing ten per cent. (10%) $Na_2CO_3$,] filter, and precipitate with hydrochloric acid, filter, and wash and preserve as paste. This dye can be used in the same way as the coloring-matter insoluble in soda solution with or without the addition of grape sugar, and mixtures of the two dyes, however obtained, can be used in the manner described without separation one from another. My new black coloring-matter, however obtained, is characterized by its peculiar relation to the fiber in that it cannot practically be used in dyeing in the usual way, but only in a strongly-alkaline dye-bath containing up to about twenty-five per cent. $Na_2CO_3$. If necessary, the dyeing is performed in the presence of a reducing agent, such as grape sugar.

The specific black coloring-matter insoluble in soda solution occurs as a bluish-black paste, or when dry as a black powder with coppery luster. It is almost insoluble in caustic soda, and also in concentrated sulfuric acid even on warming. It is practically insoluble in alcohol.

Although in the above examples I have described the use of 1.1' dinitro-naphthalene, still in practically manufacturing it is not necessary to isolate the dinitro body; but a mixture thereof containing the aforesaid 1.4' dinitro-naphthalene can be used. In this case the properties of the product obtained are somewhat affected by the presence of the similar compounds obtained from the 1.4' compound; but the product obtained can be practically applied in the same way.

Now, what I claim is—

1. As a new article of manufacture the black coloring-matter such as can be obtained by treating dinitro-naphthalene with sodium sulfid, which yields fast black shades on vegetable fiber on dyeing from a bath rendered strongly alkaline with soda, all substantially as described.

2. The specific black coloring matter which can be obtained by treating dinitro-naphthalene with sodium sulfid and subsequently with hydrochloric acid and is applied to vegetable fiber by the aid of a reducing agent such as grape sugar and a strongly alkaline solution and which is almost insoluble in caustic soda and in concentrated sulfuric acid even on warming substantially as described.

In testimony whereof I have hereunto set my hand in the presence of two subscribing witnesses.

RENÉ BOHN.

Witnesses:
ERNEST F. EHRHARDT,
ADOLPH REUTLINGER.